US012422659B2

(12) United States Patent
Schechter et al.

(10) Patent No.: US 12,422,659 B2
(45) Date of Patent: Sep. 23, 2025

(54) METHOD FOR CONTROLLING MICROSCOPIC IMAGING AND CORRESPONDING MICROSCOPE CONTROL ARRANGEMENT AND MICROSCOPE

(71) Applicant: LEICA MICROSYSTEMS CMS GMBH, Wetzlar (DE)

(72) Inventors: Markus Schechter, Wetzlar (DE); Tobias Hessler, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 159 days.

(21) Appl. No.: 18/074,553

(22) Filed: Dec. 5, 2022

(65) Prior Publication Data

US 2023/0185071 A1   Jun. 15, 2023

(30) Foreign Application Priority Data

Dec. 10, 2021 (EP) .................................. 21213830

(51) Int. Cl.
  *G02B 21/24* (2006.01)
  *G01N 21/64* (2006.01)
  (Continued)

(52) U.S. Cl.
  CPC ....... *G02B 21/244* (2013.01); *G01N 21/6458* (2013.01); *G02B 7/36* (2013.01);
  (Continued)

(58) Field of Classification Search
  CPC .......... G02B 21/244; G02B 7/36; G02B 7/30; G02B 7/08; G02B 7/285; G02B 21/245;
  (Continued)

(56) References Cited

U.S. PATENT DOCUMENTS 5,136,149 A   8/1992  Fujiwara et al.
5,604,344 A   2/1997  Finarov
(Continued)

FOREIGN PATENT DOCUMENTS

DE   195 37 376 A1   4/1996
DE   102010030430 B4  1/2015
(Continued)

OTHER PUBLICATIONS

Wako Automation: "CellVoyager (CV7000) User Guide", Sep. 30, 2017 & "User's Manual CellVoyager CV7000 High-throughput Cytological Discovery System," Aug. 31, 2016, FUJIFILM Wako Chemicals U.S.A. Corporation, USA, pp. 1-30.

(Continued)

*Primary Examiner* — Michael E Teitelbaum
(74) *Attorney, Agent, or Firm* — LEYDIG, VOIT & MAYER, LTD.

(57) ABSTRACT

A method for controlling microscopic imaging of a microscope includes providing a microscope control arrangement configured for receiving a focusing request and for receiving sample information on a sample to be imaged, wherein the microscope control arrangement activates, upon receipt of a focusing request and after having received the sample information, a predefined focusing setting depending on the sample information received for controlling focusing of the microscope for microscopic imaging of the sample.

17 Claims, 6 Drawing Sheets

(51) Int. Cl.
  *G02B 7/36*   (2021.01)
  *H04N 23/50*  (2023.01)
  *H04N 23/667* (2023.01)
  *H04N 23/67*  (2023.01)
(52) U.S. Cl.
  CPC ............. *H04N 23/50* (2023.01); *H04N 23/67* (2023.01); *H04N 23/667* (2023.01)
(58) Field of Classification Search
  CPC ............... G02B 21/365; G02B 21/241; G01N 21/6458; H04N 23/50; H04N 23/67; H04N 23/667
  See application file for complete search history.

(56) References Cited

U.S. PATENT DOCUMENTS

| | | | |
|---|---|---|---|
| 2002/0172964 A1* | 11/2002 | Ippolito | G02B 7/28 435/6.12 |
| 2006/0028716 A1* | 2/2006 | Gilbert | G02B 21/26 359/368 |
| 2011/0317260 A1 | 12/2011 | Krueger | |
| 2018/0341083 A1 | 11/2018 | Matsubara | |
| 2020/0106993 A1* | 4/2020 | Okada | G02B 21/365 |
| 2020/0183127 A1* | 6/2020 | Usui | G06T 7/337 |
| 2021/0165198 A1 | 6/2021 | Mueller-Rentz | |

FOREIGN PATENT DOCUMENTS

| | | |
|---|---|---|
| EP | 3 721 279 B1 | 9/2021 |
| EP | 3 951 472 A1 | 2/2022 |

OTHER PUBLICATIONS

Terclavers, Sven: "Focus Strategies with ZEN2," Zeiss, Germany, Jun. 13, 2018, pp. 1-30.

Merchant, Fatima A. and Kenneth R. Castleman: "Computer-Assisted Microscopy", Jun. 21, 2005, Elsevier B.V., Netherlands, pp. 1-34.

* cited by examiner

METHOD FOR CONTROLLING MICROSCOPIC IMAGING AND CORRESPONDING MICROSCOPE CONTROL ARRANGEMENT AND MICROSCOPE

CROSS REFERENCE TO RELATED APPLICATIONS

This application claims benefit to European Patent Application No. EP 21213830.9, filed on Dec. 10, 2021, which is hereby incorporated by reference herein.

FIELD

The present invention relates to a method for controlling microscopic imaging of a microscope, and to a microscope control arrangement for controlling microscopic imaging of a microscope, and to a microscope including such a microscope control arrangement. More particularly, microscopic imaging requires focus control to ensure that the acquired images are in focus.

BACKGROUND

In microscopic imaging, users need a high degree of expertise to define the right microscopic imaging parameters for imaging a sample and for keeping the sample in focus. The microscopic imaging parameters differ depending on the microscopic imaging mode (e.g. widefield or confocal) and on the kind of sample to be imaged. Additionally, during examination of a sample, focus and/or the sample itself may drift over time. Therefore, microscopic imaging nowadays often requires expert knowledge.

In microscopy, autofocusing methods based on triangulating autofocus principles are widely used and, for instance, described in DE 10 2010 030 430 B 1, U.S. Pat. No. 5,136,149 B1, and DE 195 37 376 A1.

SUMMARY

In an embodiment, the present disclosure provides a method for controlling microscopic imaging of a microscope, the method comprising providing a microscope control arrangement configured for receiving a focusing request and for receiving sample information on a sample to be imaged, wherein the microscope control arrangement activates, upon receipt of a focusing request and after having received the sample information, a predefined focusing setting depending on the sample information received for controlling focusing of the microscope for microscopic imaging of the sample.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
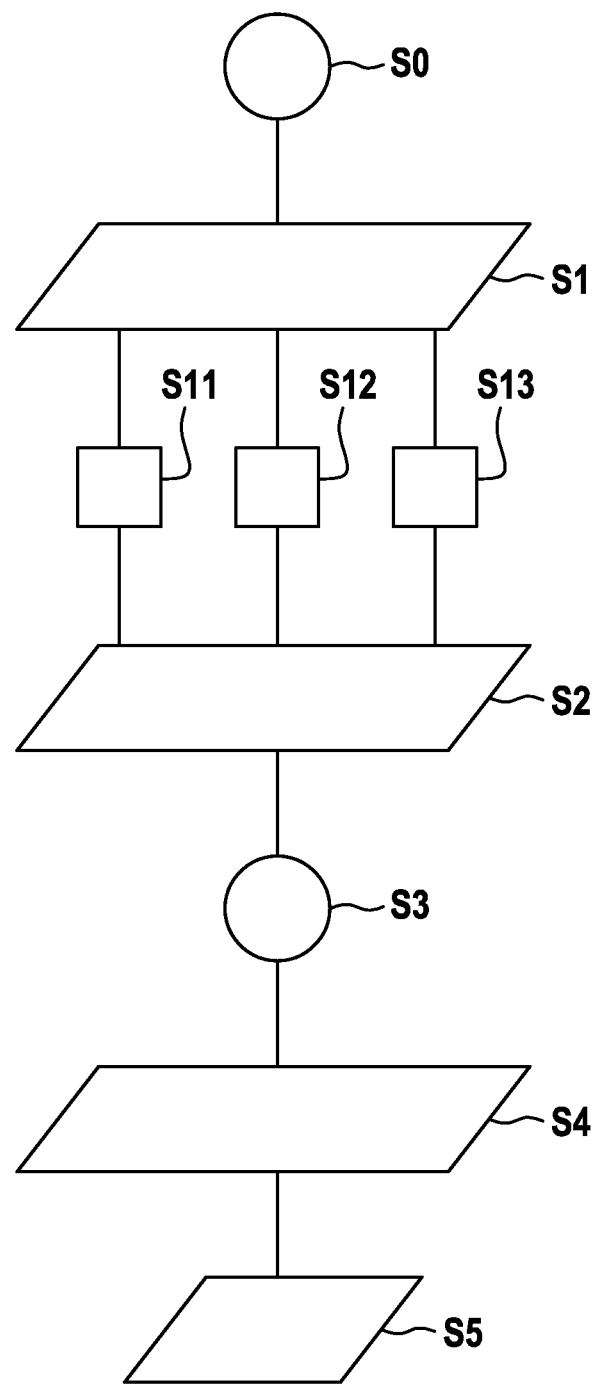
FIG. 1 shows a flowchart for controlling microscopic imaging of a microscope.

In an embodiment, the present invention provides an improved method for controlling microscopic imaging and a corresponding microscope control arrangement for controlling microscopic imaging as well as a corresponding microscope including such a microscope control arrangement.

In an embodiment, a method comprises the step of providing a microscopic control arrangement configured for receiving a focusing request and for receiving sample information on a sample to be imaged. The microscopic control arrangement activates, upon receipt of a focusing request and after having received the sample information, a predefined focusing setting depending on the sample information received for controlling focusing of the microscope for microscopic imaging of the sample. The microscopic control arrangement may include a graphical user interface (GUI) or any other interface adapted to receive a focusing request and sample information on a sample to be imaged. The microscopic control arrangement may receive the corresponding request or sample information either directly by a user or indirectly by other devices, which are e.g. triggered by a user. For example, sample information on a sample to be imaged may be received from an automatic sample detection implemented in the microscope. In this case, upon receipt of a focusing request, the microscopic control arrangement would request and/or receive the sample information from the automatic sample detection. In this context, it should be noted that the microscopic control arrangement may receive the sample information before, at the same time as or after receiving a focusing request. The microscopic control arrangement then activates a predefined focusing setting depending on the sample information received. The focusing request may typically be input by a user and received, either directly or indirectly, by the microscopic control arrangement.

"Activation of a predefined focusing setting" means that a predefined focusing setting adapted to the sample to be imaged is applied to a focusing arrangement of the microscope such that the acquired images are in focus without the need for any further user input. This activation of a predefined focusing setting is performed by the microscope control arrangement, which is also an aspect of the present invention and which is operatively coupled with such a focusing arrangement of the microscope in order to implement and control the predefined focusing setting, in other words the settings of all parameters of the components of the microscope focusing arrangement, adapted to the sample to be imaged during microscopic imaging.

Activating a predefined focusing setting initiates the decision by the microscope control arrangement instead of asking for a decision of the user, what focusing strategy (e.g. creating a focus map or performing focus correction during image acquisition) and what focusing mechanism (e.g. image or reflection based) to use, and/or what capture range to define for an image based autofocusing method, and/or where and how many focus points on or in the sample should be set for focus map generation, and/or how to correct focus drift. Thus, embodiments of the present invention enable a user without any a priori knowledge about microscopic focusing concepts to acquire microscopic images in focus and/or z-stacks around a focal plane by simply defining the kind of sample to be imaged with the result that all necessary focusing settings are then automatically done by the microscope control arrangement. This process, however, is not meant to exclude the possibility of a user overwriting the settings by entering the settings menu and/or of a user further adjusting the predefined focusing setting according to his/her knowledge and needs.

In an embodiment, the sample information, which is received by the microscopic control arrangement, relates to one or more sample properties in a three-dimensional sample space and/or to the kind of a sample carrier carrying the sample and/or to the material of the sample carrier carrying the sample and/or to a sample staining, which is typically used in fluorescence microscopy. Sample properties in a three-dimensional sample space particularly relate to a sample's constant or varying extensions particularly in a focal direction, a sample being attached to or detached from a sample carrier, a sample being adherent to a sample carrier, a sample being able to move particularly in a focal direction or a sample having a surface topology varying over time. The kind of sample carrier carrying the sample particularly relates to a slide, a Petri dish, a well plate, a multi chamber or a lab-on-a-chip, etc. Also the material of the sample carrier plays a role regarding the diffractive index, typical materials being glass or plastic, like PMMA or the like. Regarding the sample properties, it may also be useful to identify whether a sample is living or fixed. The knowledge of a sample staining may be important for selecting the desired emission wavelength, in which an image is acquired.

In an embodiment, no further information, especially no further information by user input is required to be received by the microscopic control arrangement in order to activate the predefined focusing setting. Once e.g. the user activates focusing and the microscopic control arrangement receives the corresponding focusing request, a predefined focusing setting is activated matching the defined sample type, which is defined by the sample information received from user input and/or from automatic sample detection. No further information is required from a user in order to activate the predefined focusing setting. This highly improves a user-friendly operation of the microscope and enables less experienced users to operate the microscope.

In an embodiment, the predefined focusing setting includes an automated system-based determination of one or more focus points at defined x-y-positions of the sample.

Only one focus point may be sufficient in case of an adherent sample being directly adherent to the sample carrier bottom or having a constant surface topology. The focus has to be kept constant to keep the sample in focus over a defined x-y-range.

A focus map including one or more such focus points over a defined x-y-range is typically applied in case of a detached sample.

In case of dynamic samples, due to a movement of the sample it is mostly not possible to define a focus map, such that the focus point, particularly its z-value, depends on the x-y-position of the sample where the image is to be taken at a particular time point, such that focus points cannot be pre-determined. The way of defining the focus setting depending on various sample types is described in more detail in the Detailed Description section.

In another embodiment, one or more of the one or more focus points are rewritable by a user according to his/her knowledge or experience during imaging of a specific sample and according to his/her needs.

In a further embodiment, the one or more focus points are determined by an autofocusing method depending on the activated predefined focus setting. In an embodiment, the autofocusing method includes at least one of a triangulating autofocusing method and an image based autofocusing method evaluating a stack of images of the sample, each image being captured at a different focal position. Autofocusing methods are described in more detail in the Detailed Description section.

In an embodiment, the image based autofocusing method includes the step of generating a first stack of images of the sample, each image being captured at a different focal position, using a first focal step size over a first range of focal positions, and generating a second stack of images of the sample using a second focal step size over a second range of focal positions, the second focal step size being smaller than the first focal step size. Applying the first "coarse" focal step size over a first range yields a first "coarse" focus level in a short period of time. Starting from there, by applying a second smaller focal step size over a second smaller range around the first "coarse" focus level the optimum focus level can be determined with high accuracy.

In an embodiment, the predefined focusing setting is corrected for a drift of focus over time. Particularly, the drift of focus is corrected at least in one of the following cases: after a predetermined number of image acquisition positions at different x-y-positions of the sample; after a predetermined number of time points of image acquisition; after a predetermined time interval; and, in case of more than one focus points, for a predefined number of focus points. Drift correction is described in further detail in the Detailed Description section.

In an embodiment, the sample information on a sample to be imaged is pre-categorized in predefined sample specifications, which are at least two different sample specifications, which are in particular selectable by a user. This increases user friendliness of defining sample information of a sample to be imaged.

The predefined sample specifications, particularly relating to sample properties in a three dimensional sample space, may comprise at least one of: the sample is adherent to a sample carrier for carrying the sample ("adherent" sample); the sample is detached from a sample carrier for carrying the sample and/or the sample has a varying extension in a focal direction ("detached" sample); the sample is able to move, particularly in a focal direction, and/or the sample has a surface topology varying over time ("dynamic" sample).

In a further embodiment, if the sample is "adherent", then an autofocusing control based on a triangulating autofocusing method is used for determining and/or maintaining a focus level, which focus level is used for sample imaging.

In another embodiment, if the sample is "detached", then a focus map of one or more focus points is defined. In an embodiment, the focus map is defined with a predefined or a selectable number and/or density of focus points within a region of interest ("ROI"). Further, the focus map may be determined by an image based autofocusing method evaluating a stack of images of the sample, each image being captured at a different focal position. Such an image based autofocusing method may also be re-applied during imaging of the sample. After determining the focus map and during imaging of the sample, an autofocusing control based on a triangulating autofocus method may be used for maintaining the focus in a time-saving manner. Further details are described in the Detailed Description section.

In another embodiment, if the sample is "dynamic", then an autofocus control based on an image based autofocusing method evaluating a stack of images of the sample, each image being captured at a different focal position, is used to find the optimum focus point for imaging the sample at a given time point.

In another embodiment, the microscope control arrangement is configured to allow for activating of different microscopic imaging modes, which are selectable independently from the activated predefined focusing setting. Such microscope imaging modes may comprise widefield, confocal or lightsheet microscopy. In case of fluorescence microscopic imaging, two different microscopic imaging modes may be widefield and confocal microscopy. It is particularly useful that a user, according to this embodiment, will not need to specify different focus settings when changing from one microscopic imaging mode to another, since the predefined focus setting will not change or is automatically adapted by the microscope control arrangement.

In another aspect of the present invention, a microscope control arrangement is provided, the microscope control arrangement comprising one or more processors and being adapted for controlling microscopic imaging of a microscope, wherein the microscope control arrangement is configured for receiving sample information concerning a sample to be imaged and for receiving a focusing request, wherein said microscope control arrangement is further configured to activate, upon receipt of the focusing request, a predefined focusing setting depending on the sample information received for controlling focusing of the microscope for microscopic imaging of the sample.

In an embodiment, the microscope control arrangement is configured to execute a method according to the present invention.

In an embodiment, the microscope control arrangement comprises a graphical user interface including control widgets configured for receiving user inputs, said control widgets including at least one focus control widget for receiving a focus request by a user and at least one sample information widget for receiving sample information by a user.

In another aspect of the invention, a microscope for microscopic imaging of a sample is provided, the microscope comprising a focusing arrangement and the microscope control arrangement, the focusing arrangement being operatively coupled with the microscope control arrangement.

It should be noted that the description of the method and embodiments of the method do also represent a description of the microscope control arrangement as well as of the microscope according to the other aspects of the invention and of corresponding embodiments.

It should be noted that the above features of the embodiments can—wholly or in part—be combined to achieve other embodiments still falling under the scope of the present invention.

As used herein, the term "and/or" includes any and all combinations of one or more of the associated listed items and may be abbreviated as "/".

Further embodiments and their advantages are described below in connection with the figures.

The figures will be described comprehensively, same reference signs designating identical or at least functionally identical elements.

FIG. 1 shows a flowchart, which may be adapted according to embodiments of the present invention. Microscopic imaging may be performed in different microscopic imaging modes, and embodiments of the present invention prove very advantageous with microscopes where different microscopic imaging modes can be activated. Microscopic imaging modes may comprise a widefield and a confocal imaging mode, including brightfield or transmission light, or a lightsheet imaging mode. In embodiments of the present invention, different microscopic imaging modes, particularly widefield and confocal imaging modes, can be selected with the same, particularly fluorescence microscope for imaging samples of different sample types.

In a first step, a user starts microscopic imaging in step S0. In case of fluorescence imaging, the user may select a fluorescence channel, i.e. the emission wavelength of a stained sample to be observed. The user may also select a microscopic imaging mode.

In a next step S1, sample information on the sample to be imaged needs to be input either by a user or by automatic sample detection. In the embodiment of FIG. 1, it is assumed that three different kinds of sample information S11, S12 and S13 exist or that the sample information input can be assigned to three different kinds of samples or that one of three different kinds of predefined sample specifications can be selected. It should be noted that the number of sample specifications can be preferably two or more as will be discussed in further detail in connection with FIG. 2.

In a next step S2, the microscope control arrangement receives a focusing request either directly or indirectly by a user or as a direct result of having completely received the necessary sample information.

In a next step S3, a predefined focusing setting depending on the sample information S11 or S12 or S13 received is activated. Various possible focusing settings are discussed below in connection with the following figures.

In an embodiment, steps S1 and S2 are both executed by user inputs. Once the user activates focusing by sending a focusing request in S2, a predefined focusing setting is activated matching the user-defined sample type in S1.

It should be noted that the steps S1 and S2 may be swapped such that a focusing request may be sent before the necessary sample information has been received, prompting the user (or the automatic sample detection) to define the kind of sample to be imaged for then choosing the predefined focusing setting.

In an embodiment, in step S4, the user may select a microscopic imaging mode for microscopic imaging of the sample. Further, in a step S5, a user may specify that z-stack imaging is applied, i.e. a plurality of images of the sample are generated, each image being captured at a different focal position, to obtain a stack of essentially parallel images in the focal direction, wherefrom a three-dimensional image can be generated.

It should be noted that the steps S4 and S5 do not affect the process of selecting a predefined focusing setting depending on the sample information received. On the other hand, in embodiments of the present invention, a user might rewrite specific settings of the predefined focusing setting if expedient.

In an embodiment, the sample information relates to one or more sample properties in a three-dimensional sample space and/or to the kind and/or material of the sample carrier carrying the sample and/or to a sample staining for fluorescence microscopy. In order to increase user friendliness, one of a number of sample properties/specifications and/or one of different kinds of sample carriers may be selected by a user through a graphical user interface. This embodiment will be described in more detail in connection with FIG. 2.

It should be noted that, after a predefined focusing setting is activated in step S3 depending on the sample information received in step S1, no further information by user input is required to be received such that no in-depth experience of a user in microscopy is required apart from the basic user knowledge concerning the sample to be imaged.

Figure 2:
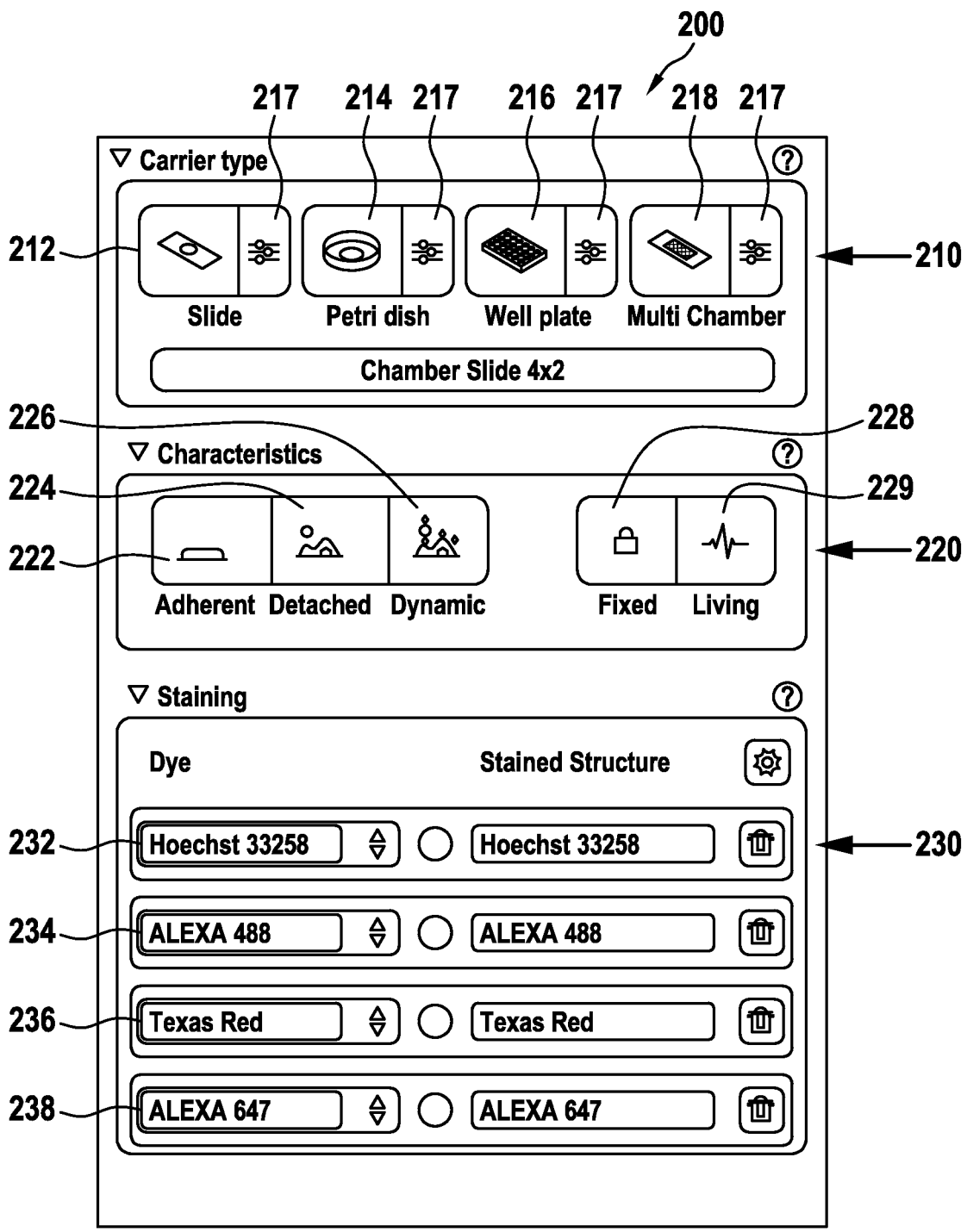
FIG. 2 shows a graphical user interface configured for receiving sample information on a sample to be imaged.

FIG. 2 schematically shows a graphical user interface 200, more particularly a part of a menu of a graphical user interface used in a microscope for microscopic imaging according to an embodiment of the present invention. This part of graphical user interface mainly relates to an input of the required sample information for selecting a predefined focusing setting. In this embodiment, the sample information is composed of the kind and/or material of sample carrier/carrier type, specific sample properties in the three-dimensional sample space, which properties are pre-categorized in predefined sample specifications/characteristics, and the sample staining characteristics in case of fluorescence microscopy.

The graphical user interface 200 shown in FIG. 2 comprises three menu bars 210, 220 and 230. The first and second menu bars 210 and 220 help the user select a carrier type and a sample characteristic matching the sample to be imaged. Menu bar 210 comprises a number of different kinds of carrier types, which may exemplarily be a slide 212, a Petri dish 214, a well plate 216, and a multi chamber 218. The user may also select menu point 217 assigned to each of the carrier types to specify the material of the sample carrier. Selection of carrier type and material allows the software to determine an appropriate focus point distribution or a selection of appropriate sample ranges for setting focus points, which are used in the focusing setting.

Menu bar 220 allows a user to choose among different predefined sample specifications/characteristics, which are in this embodiment exemplarily "adherent" 222, "detached" 224 and "dynamic" 226, and, additionally, "fixed" 228 and "living" 229.

The specification "adherent" 222 characterizes an essentially flat sample of essentially no topology or of an essentially constant extension in a focal direction, e.g. a two-dimensional cell culture on a cover slip or well plate bottom. Typically, an "adherent" sample is directly attached to the sample carrier.

A "detached" sample 224 characterizes a sample, which has a varying extension in a focal direction and/or which is detached from the sample carrier bottom, e.g. a tissue mounted on a slide without coverslip. Both effects result in varying focus points over the sample surface. In the definition used herein, a "detached" sample is not moving over time.

In contrast, a "dynamic" sample 226 characterizes a sample, which moves over time, particularly a sample, which may move closer to or further away from the sample carrier bottom over time or the topology of the sample surface is varying over time.

In addition to the three sample specifications 222, 224, 226, a user may select whether the sample is "fixed" 228 or "living" 229. This specification may be used by the software to switch to another focus setting if appropriate. For example, if a user selects a "detached" sample characteristic 224 for a living sample 229, the software may apply the predefined focus setting for a "dynamic" sample 226 characteristic instead of a setting for a "detached" sample 224.

Menu bar 230 allows the user to select the kind of sample staining. The user may select the dye, in particular by selecting one of the sample staining types 232, 234, 236, 238. Thereby, the user selects a particular fluorescence channel or emission wavelength representing sample details of interest. For instance, a nucleus or a cell wall of a cell can be imaged in different fluorescence channels or emission wavelengths.

Figure 3:
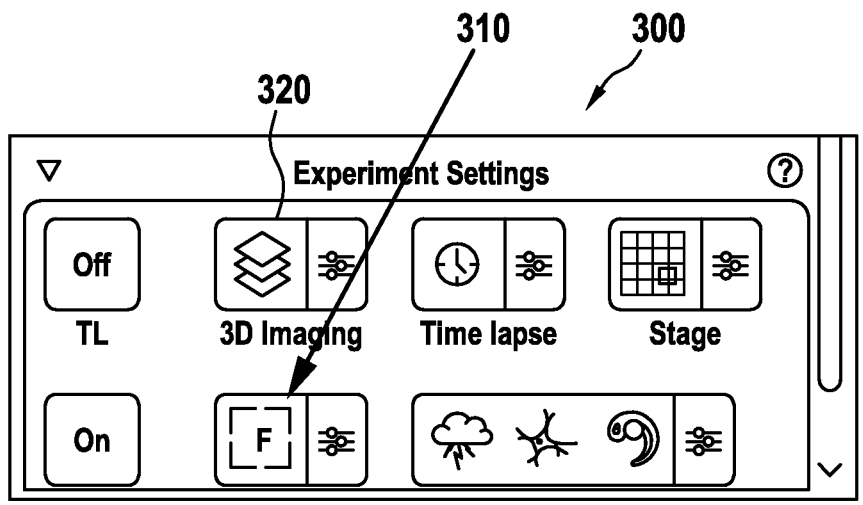
FIG. 3 shows a graphical user interface configured for receiving a focusing request.

FIG. 3 schematically shows an embodiment of a graphical user interface 300, more particularly of a part of a graphical user interface related to the activation of focusing. The graphical user interface 300 of FIG. 3 provides a menu point or widget 310 "F", which is selectable by a user to request focusing. If the sample definition according to the embodiment of FIG. 2 has not been completed, a user would be prompted to do so upon selecting the focusing request 310. Selecting the menu point 310 corresponds to sending a focus request according to step S2 of FIG. 1.

In the embodiment of a fluorescence microscope, the user may further select or has already selected a microscopic imaging mode, for instance, either widefield or confocal imaging. Furthermore, a user may select three-dimensional imaging by selecting the menu point "3D imaging" 320 of the graphical user interface 300 of FIG. 3. When choosing menu point 320, a z-stack of images in the focal direction around an optimal focus level is acquired, which images are further processed to generate a three-dimensional image. Step S5 of FIG. 1 corresponds to a user selecting menu point 320 of FIG. 3.

Any menu points or widgets depicted in FIGS. 2 to 6 but not discussed herein may be relevant to image acquisition in general.

Figure 4:
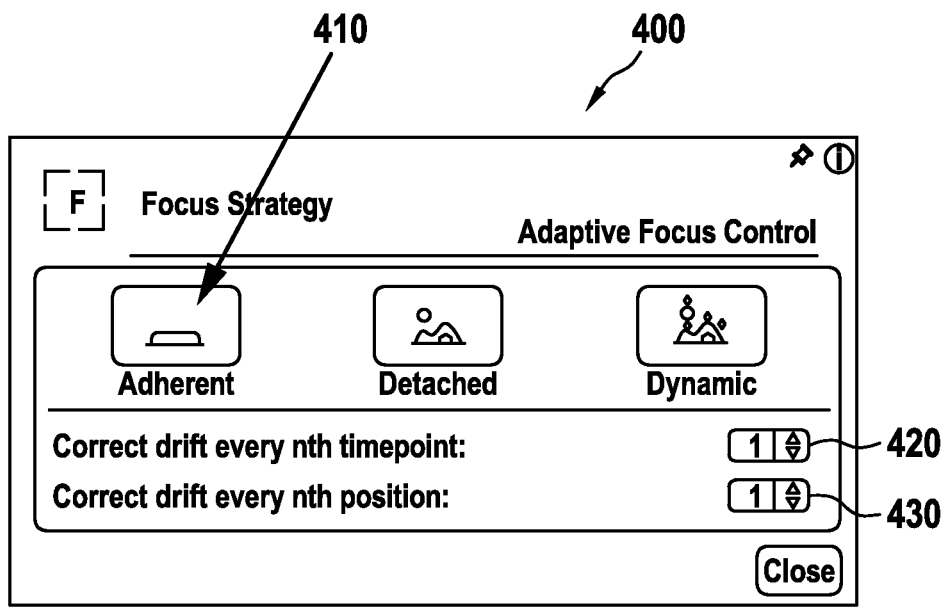
FIG. 4 shows a graphical user interface corresponding to a first sample specification.

FIG. 4 schematically shows an embodiment of a graphical user interface 400, more particularly a part of a graphical user interface related to a predefined focus setting according to the selected sample specification "adherent" 222 (see FIG. 2). As already discussed above, a user may rewrite or adjust a predefined focusing setting according to his/her experience and needs. In the example shown, a user can optionally open an "adherent" focus menu by selecting widget 410 of the graphical user interface 400. In the example shown, the user may edit default settings related to drift correction. Before options of drift corrections are discussed in more detail, the predefined focusing setting in case of an "adherent" sample are explained.

The predefined focusing setting in case of an "adherent" sample (in the following "adherent focusing setting") is as follows. A single focus point at an x-y-position of the sample is determined e.g. by a triangulating autofocusing method, which focus point may be used as the focus level for imaging of the whole sample or of various parts of the sample as an "adherent" sample lacks a varying topology in the focal direction. A triangulating autofocusing method as, for instance, described in DE 10 2010 030 430 B1, is able to find and to hold a focus point of an adherent sample such that microscopic images of the sample are in focus. Regarding details of the design, structure, operation and functions of such an triangulating autofocusing method and device, reference is made explicitly to document DE 10 2010 030 430 B1. The autofocus detector of such a triangulating autofocusing device is able to detect any deviation of the sample from the chosen (optimal) focus point/level in a focal direction. By means of feedback control, any deviation from the (optimal) focus point/level can be reversed by a corresponding alteration of the distance of the sample/sample carrier to the microscope objective. For sake of simplicity, such a triangulating autofocusing control is abbreviated in the following as "AFC".

By opening the adherent focus menu by clicking/selecting widget 410, a user may edit default settings related to drift correction. Drift of focus may occur either due to external influences, like temperature variations, movements or vibrations, or because of movements of the sample carrier. In microscopic imaging, typically, depending on the experiment, images are acquired repeatedly after a predefined time interval (e.g. time intervals from 0.1 seconds to 5 minutes are conceivable). The time intervals of image acquisition are either predefined by default or are defined by a user. Drift correction can be performed every nth time point. By default, n may be 1, but other settings are possible. By choosing menu point 420, a user may increase n in order to reduce the frequency of drift correction during imaging. Further, drift may be corrected at every position of image acquisition or at every second position of image acquisition, and so on, generally at every nth position. In this example, the default value is a drift correction at every position; this value may be edited by a user by means of menu point 430.

Drift can effectively be corrected by a focus holding device such as an AFC device, which is fast and does not expose the sample with light, which can harm a living sample or cause bleaching. For drift correction, a reference z-level (the z-direction corresponds to the focal direction) needs to be defined, which typically is the focus level of the sample. When acquiring a z-stack of images for three-dimensional imaging of a sample, the upper and lower z-limits of the z-stack are referenced to the defined focus level. During image acquisition, the AFC corrects drift by adjusting the predefined focus level. Since upper and lower z-limits of the z-stack are referenced to the focus level, the drift corrected z-stack can be acquired.

Figure 5:
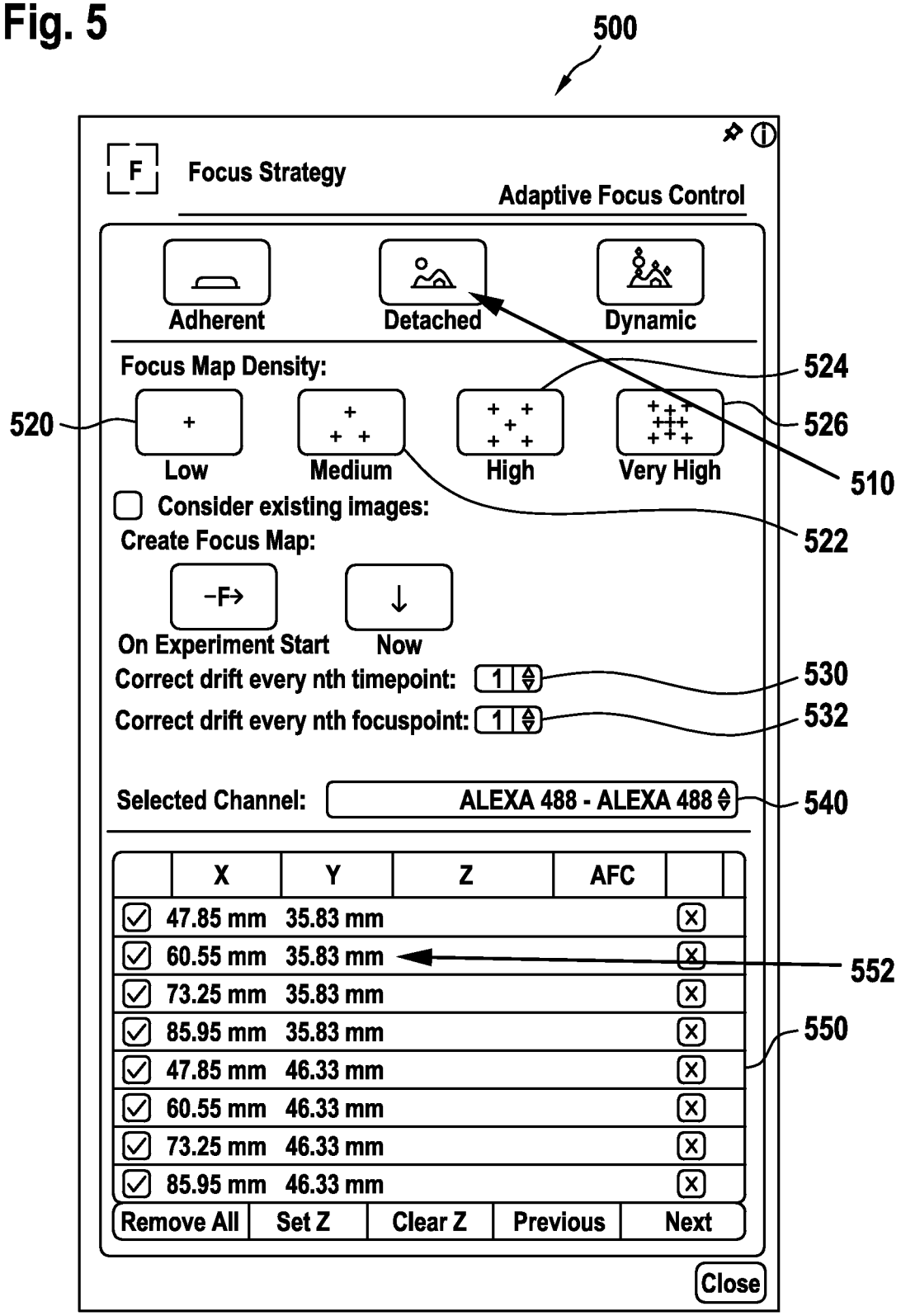
FIG. 5 shows a graphical user interface corresponding to a second sample specification.

FIG. 5 schematically shows an embodiment of a graphical user interface 500, more particularly of a part of a graphical user interface related to the predefined focusing setting in case of a "detached" sample (in the following "detached focusing setting"). As already mentioned above, a user may rewrite or adjust focus settings according to his/her experience or needs. In the example shown, a user can optionally open a detached focus menu by selecting the "detached" menu point 510 of the graphical user interface 500. Before discussing the user options resulting from selecting menu point 510, the predefined detached focusing setting for a "detached" sample is explained.

As stated above, a "detached" sample has a varying extension in a focal direction and/or is detached from the sample carrier bottom such that a varying topology in the focal direction must be assumed. In an embodiment, focus maps are generated for such samples, a focus map comprising one or more focus points over an x-y-area of the sample, such that the focus map, especially with a high density of focus points, tries to approximate the sample topology. The focus points of a focus map may be determined by an image based autofocusing method, which evaluates a stack of images of the sample, each image being captured at a different focal position. A metric is applied to each of the images of the stack of images, the metric calculating a metric value for each of the images, different metric values being associated to a different image sharpness or blurriness of the corresponding images. There are quite a number of such metrics suited for autofocusing, like metrics based on gradient methods, based on wavelet decomposition methods, based on contrast methods, based on autocorrelation methods etc. By such an image based autofocusing method, the optimum focus point at a given x-y-position of the sample can be determined.

In order to save time and processing power, the image based autofocusing method may be combined with AFC such that a suitable starting point or interval can be defined by determining the focus point found by AFC as a starting point, in a z-region around which starting point a stack of images is acquired for image based autofocusing.

Additionally or alternatively, the image based autofocusing method may include the step of generating a first stack of images of the sample, each image being captured at a different focal position, using a first focal step size over a first range of focal positions, and generating a second stack of images of the sample using a second focal step size over a second range of focal positions, the second focal step size being smaller than the first focal step size. In this embodiment, a first "coarse" focus measuring cycle is run to determine a first "coarse" focus point/level, and then in a z-region of this first focus point/level, a second focus measuring cycle is of a smaller step size is run to obtain the optimum focus point/level with higher accuracy. The second range is preferably smaller than the first range.

A predefined detached focusing setting determines a focus map of a predetermined number or density of focus points by means of an image based autofocusing method as described above, which method may be combined with AFC as also discussed above. By selecting menu point 510 of the graphical user interface 500, a user is able to edit the default settings. For example, the user may choose among different focus map densities, like "low" 520, "medium" 522, "high" 524, and "very high" 526.

Further, the user may change default settings related to drift correction. Again, by default, a drift correction is performed at every time point of image acquisition. This setting can be changed such that drift correction is performed every nth time point by selecting menu point 530 accordingly. Additionally, in this example, drift correction may be performed at every focus point of the focus map (by default) or every second, third, etc., or generally nth focus point only (by user selection of menu point 532). Choosing n>1 saves time for image acquisition, especially in case of a low drift.

Furthermore, by selecting menu point 540 of the graphical user interface 500 shown in FIG. 5, a user may select an emission wavelength to be used for the detached focusing setting in accordance with the dye(s) chosen in menu bar 230 of the graphical user interface 200 shown in FIG. 2.

Finally, menu bar 550 shows all focus points used for focus map creation with their x-y-positions. Every single focus point, for example the second focus point 552, may be overwritten by the user.

Another option provided by the graphical user interface 500 of FIG. 5 is the creation of a focus map either automatically at the start of an experiment ("On Experiment Start"; by default) or on a user request ("Now").

Figure 6:
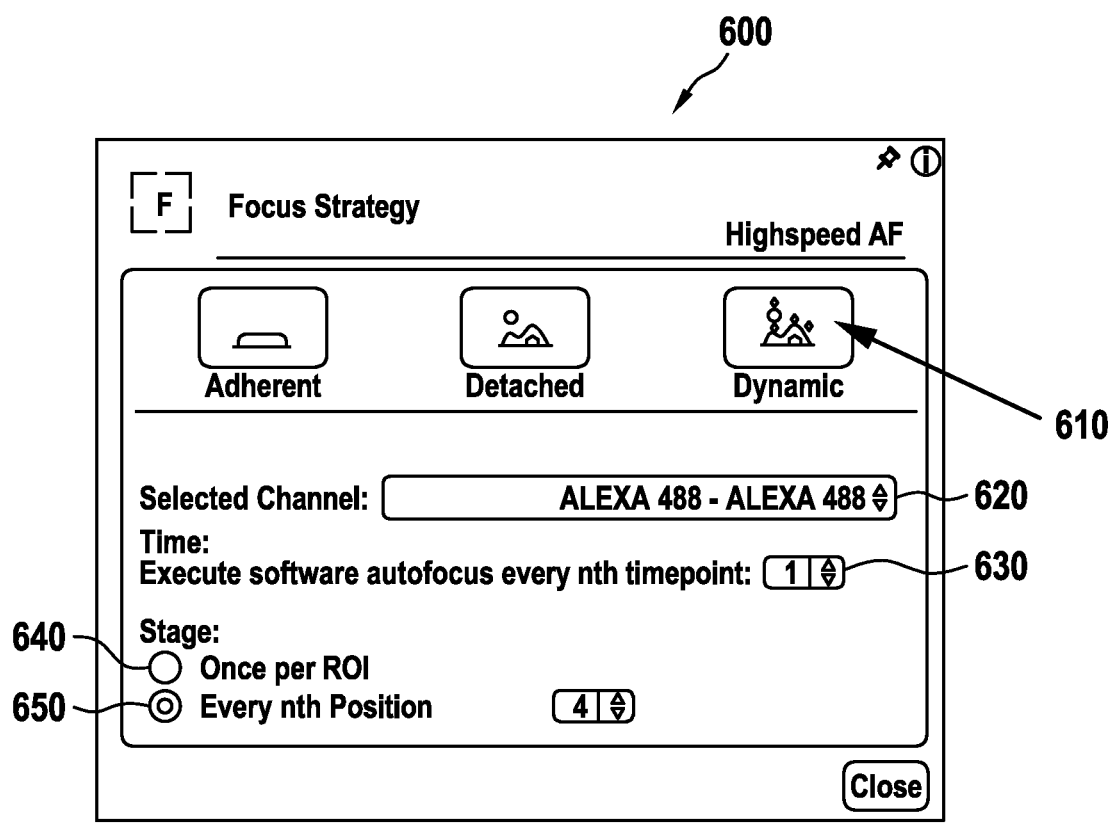
FIG. 6 shows a graphical user interface corresponding to a third sample specification.

FIG. 6 schematically shows an embodiment of a graphical user interface 600, more particularly of a part of a graphical user interface related to the predefined focusing setting in case of a "dynamic" sample (in the following "dynamic focusing setting"). As already mentioned above, a user may rewrite or adjust focus settings according to his/her experience or needs. In the example shown, a user can optionally open a dynamic focus menu by selecting the "dynamic" menu point 610 of the graphical user interface 600. Before discussing the user options resulting from selecting menu point 610, the predefined dynamic focusing setting is explained.

As stated above, a "dynamic" sample is able to move, particularly in a focal direction, and/or the topology of the sample is varying over time. Thus, the optimum focus point has to be determined at any time point of image acquisition. The focus determination is performed by an image-based autofocusing method, particularly by such highspeed methods. Image-based autofocusing methods are described above in connection with the detached focusing setting.

By selecting menu point 610, a user may edit default settings of the dynamic focusing setting. For example, the user may choose menu point 620 in order to change the selected fluorescence channel, i.e. switch to another fluorescence emission wavelength for observing the sample. Further, by selecting menu point 630, the user may change the default setting, according to which the image-based autofocusing method is performed at every time point of image acquisition. "Software autofocus" designates the implemented highspeed image-based autofocusing method. If the dynamic of the sample is low, it is expedient to execute software autofocus only every nth time point, n being greater than 1.

By selecting menu point 640, the implemented software autofocus will be executed at a predefined position of every region of interest (ROI) selected by a user for image acquisition. In contrast, by choosing menu point 650 and selecting a value of n (in this example n=4), software autofocus may be executed every nth position in each ROI.

Figure 7:
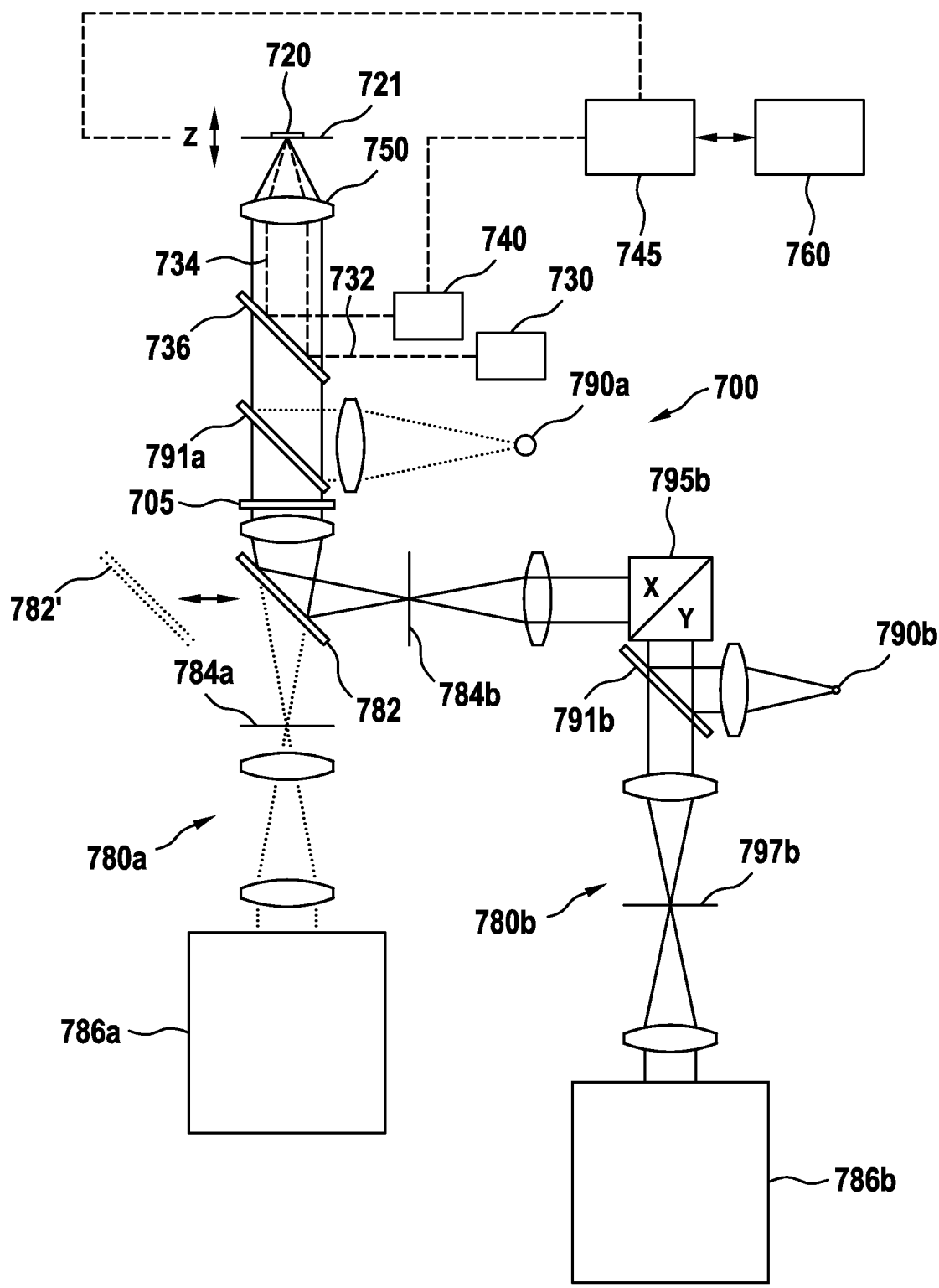
FIG. 7 schematically shows a microscope for microscopic imaging of a sample.

FIG. 7 schematically shows a microscope 700 for microscopic imaging of a sample according to an embodiment of the present invention. FIG. 7 illustrates a fluorescence microscope 700, which comprises two detection units, i.e. a first detection unit 780a and a second detection unit 780b. By means of a switchable or displaceable mirror 782, or any other switching means, observation light may selectively be coupled in either the first detection unit 780a or the second detection unit 780b. In the position illustrated in FIG. 7, observation light is coupled via mirror 782 into the second detection unit 780b to the right. If mirror 782 is moved out of the position indicated, as illustrated with 782', the light path directly proceeds without being deflected and thus observation light, as illustrated with dotted rim rays, is coupled into the first detection unit 780a. Optical lenses may be in an illumination and detection beam path.

The first detection unit 780a is, in the example shown in FIG. 7, a widefield detection unit in which an image plane is indicated 784a. By using lenses, the observation light is collimated and irradiated into a detector arrangement 786a in the first detection unit 780a. Detector arrangement 786a may be configured to split the observation light into different detection channels. As to a detector arrangement 786a usable in the first detection unit 780a, specific reference is made to the EP 3 721 279 B1, particularly to detection unit 10 as illustrated in FIG. 3 therein and the corresponding explanations, and the disclosure is incorporated by reference. An illumination unit for widefield detection in the first detection unit 780a is illustrated in a simplified manner and indicated 790a. Its light may be coupled into an illumination beam path of the fluorescence microscope 700 in any way known in the art of microscopic illumination, such as using a dichroic mirror 791a and a barrier filter 705.

The second detection unit 780b is, in the example shown in FIG. 7, a confocal detection unit in which an image plane is indicated 784b. A point light source 790b may be provided for confocal detection using confocal detection unit 780b. Point light source 790b may particularly be a pinhole opening into which laser light may be focussed, or an end of a light guide or fibre optics from which light emanates in a point-like manner. Point light source 790b is conjugated with an intermediate image plane 784b and an object plane 721 in the sample 720, such that illumination light may, via a dichroic mirror 791b and illumination optics, be focussed to a point of the object plane 721 in a scanned manner using a X/Y scanner 795b which may be arranged in a tele-centric plane or a plane conjugated therewith. This allows for scanning the sample 720 in the sample plane 721, as generally known. A pinhole is indicated 797b. Again, for further details, specific reference is made to EP 3 721 279 B1, particularly to detection unit 20 as illustrated in FIG. 3 therein and the corresponding explanations, and the disclosure is incorporated by reference. The same applies for a detector arrangement 786b which may be configured to split the observation light into different detection channels. Also as to a detector arrangement 786b usable in the second detection unit 780b, specific reference is made to EP 3 721 279 B1.

The microscope 700 allows a user to select between (at least) two different microscopy operation modes or microscopic imaging modes, namely widefield and confocal imaging. Of course, the herein described focussing concepts can also be applied to a microscope providing only one microscope imaging mode, such as only widefield imaging. In such microscopes providing two or more imaging modes, the operation concepts in the respective operation modes are substantially different from each other. Settings influencing the images obtained in these operation modes include, for example, illumination settings of widefield light sources (area sensors or "cameras") versus illumination settings for scanning light sources and components of the respective illumination beam paths, detection settings for an area detector versus detection settings for components such line or point detectors including components of the respective detection beam paths, and focusing settings, as explained above. Each of these components may generally, if adjustable, have an influence on the image results and must therefore be individually and carefully adjusted. According to embodiments of the present invention, at least the focusing setting is automatically determined dependent on the type of sample without any further interaction with the user.

Thus, particularly for users unexperienced in one of the operation modes, or in more stressful observation situations, such as when observing moving samples, embodiments of the present invention overcome considerable hurdles and reduces distraction from the actual task of observation and examination of a sample. As mentioned, embodiments of the present invention are not limited to widefield and confocal operation even if described herein.

In conventional concepts for operating a fluorescence microscope 700, a user still has to have detailed knowledge of the technical background of determining and holding the focus during image acquisition in respect of each of the operation modes and what the effect to the result achieved is. As mentioned, a user may even be required to "switch" conceptually and mentally between generally different operation and interaction concepts in conventional arrangements. This problem is overcome according to embodiments of the present invention, in which, as explained above, a sample type-based focus control of a microscope, particularly in selectable different microscopy operation modes, is realized.

FIG. 7 also shows a focusing arrangement including an autofocusing control 745 operatively coupled to a microscope control arrangement 760. In the example shown, an AFC is implemented as described e.g. in U.S. Pat. No. 5,136,149 B1 or in DE 10 2010 030 430 B 1. For a more detailed description of the AFC, reference to these documents is explicitly made. According to the underlying triangulating autofocus principle, an autofocus measuring beam 732 is generated by an autofocusing light source 730 and deflected by deflection element 736 in order to pass through microscope objective 750 and to be directed onto the sample 720. The reflected beam 734 passes through the microscope objective 750 back to the deflection element 736 and is directed to an autofocus detector 740, which is position sensitive relating to the position of the reflected beam on the detection surface of the autofocus detector 740. The output signal of this detector 740 is thus correlated with the position of the reflected beam 734 in relation to a predefined position on the detection surface of the autofocus detector 740. The positon of the reflected beam 734 varies if the distance of the sample 720 to the microscope objective 750 varies. A variation of this distance may be caused by a topology of the sample varying in the focal direction or by a sample moving in the focal direction or by a drift of focus as explained above.

The autofocus detector 740 is operatively connected to an autofocus control 745, which keeps the distance of the sample 720 (or of a reference surface) to the microscope objective 750 constant by shifting the microscope objective 750 and/or the microscope stage including the object plane 721 in the focal (z-) direction (illustrated by small arrow next to object plane 721) to balance out an out of focus movement/drift.

In this embodiment, only an example of an AFC control is illustrated. Other additional or alternative autofocusing methods, particularly image-based autofocusing methods can and should be implemented according to embodiments of the invention as discussed above. Such image-based autofocusing methods may also be controlled by autofocus control 745 without limiting the possibility of having other autofocus controls, which are here illustrated by the present general autofocus control 745. The microscope control arrangement 760, which is operatively coupled to the autofocus control 745, according to this embodiment comprises one or more processors and is adapted for controlling microscopic imaging of the microscope 700, and is further configured for receiving sample information concerning a sample 720 to be imaged and for receiving a focusing request and is further configured to activate, upon receipt of the focusing request, a predefined focusing setting depending on the sample information received for controlling focusing of the microscope 700 for microscopic imaging of the sample.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

S0, S1, S11, S12, S13, S2, S3, S4, S5 method steps
200 graphical user interface
210, 220, 230 menu bar
212, 214, 216, 217, 218 menu point, widget
222, 224, 226, 228, 229 menu point, widget
232, 234, 236, 238 menu point, widget
300 graphical user interface
310, 320 menu point, widget
400 graphical user interface
410, 420, 430 menu point, widget
500 graphical user interface
510, 520, 522, 524, 526 menu point, widget
530, 532, 540, 550, 552 menu point, widget
600 graphical user interface
610, 620, 630, 640, 650 menu point, widget
700 microscope
705 barrier filter
720 sample
721 object plane
730 autofocusing light source
732 autofocusing measurement beam
734 reflected beam
736 deflection element
740 autofocus detector
745 autofocusing control
750 microscope objective
760 microscope control arrangement
780*a* first detection unit
780*b* second detection unit
782 mirror
782' mirror
784*a* image plane
784*b* intermediate image plane
786*a* detector arrangement
786*b* detector arrangement
790*a* illumination unit
790*b* point light source
791*a* dichroic mirror
791*b* dichroic mirror
795*b* scanner
797*b* pinhole

The invention claimed is:

1. A method for controlling microscopic imaging of a microscope, the method comprising:
   providing a microscope control arrangement configured for receiving a focusing request and for receiving sample information on a sample to be imaged, wherein the sample information comprises a respective sample specification selected from a plurality of predefined sample specifications, wherein the plurality of predefined sample specifications comprises:
   the sample being adherent to a sample carrier for carrying the sample;
   the sample being detached from the sample carrier for carrying the sample;

the sample having a varying extension in a focal direction;

the sample being able to move; and/or the sample having a surface topology varying over time;

upon receipt of the focusing request and receiving the sample information, activating, via the microscope control arrangement, a predefined focusing setting depending on the sample information for controlling focusing of the microscope for microscopic imaging of the sample, wherein the activating the predefined focusing setting automatically initiates a focus strategy associated with the respective sample specification, wherein the initiating the focus strategy comprises:

when the respective sample specification specifies the sample as being adherent to a sample carrier for carrying the sample, using a triangulating autofocusing method for determining and/or maintaining a focus point, the focus point being used for sample imaging, when the respective sample specification specifies the sample as being detached from the sample carrier for carrying the sample or having a varying extension in a focal direction, defining a focus map of one or more focus points, or when the respective sample specification specifies the sample as being able to move, using an image based autofocusing method by evaluating a stack of images of the sample, each image being captured at a different focal position.

2. The method according to claim 1, wherein the sample information relates to one or more sample properties in a three dimensional sample space and/or to a kind of the sample carrier carrying the sample and/or to a material of the sample carrier carrying the sample and/or to a sample staining.

3. The method according to claim 1, wherein no further information by user input is required to be received by the microscope control arrangement in order to activate the predefined focusing setting.

4. The method according to claim 1, wherein the predefined focusing setting includes an automatic determination of one or more focus points at defined x-y-positions of the sample.

5. The method according to claim 4, wherein one or more of the one or more focus points are rewritable by a user.

6. The method according to claim 4, wherein the one or more focus points are determined by a respective autofocusing method depending on the activated predefined focus setting.

7. The method according to claim 1, wherein the image based autofocusing method includes generating a first stack of images of the sample, each image being captured at a different focal position, using a first focal step size over a first range of focal positions, and generating a second stack of images of the sample using a second focal step size over a second range of focal positions, the second focal step size being smaller than the first focal step size.

8. The method according to claim 1, wherein the predefined focusing setting is corrected for a drift of focus over time.

9. The method according to claim 8, wherein the drift of focus is corrected at least in one of the following cases:

after a predetermined number of image acquisition positions at different x-y-positions of the sample;

after a predetermined number of time points of image acquisition;

after a predetermined time interval; or in case of more than one focus point of one or more focus points at defined x-y-positions of the sample that are included as an automatic determination of the predefined focusing setting, for a predefined number of focus points.

10. The method according to claim 1, wherein the focus map is defined with a predefined or selectable number and/or density of focus points.

11. The method according to claim 1, wherein the focus map is determined by an image based autofocusing method evaluating a stack of images of the sample, each image being captured at a different focal position.

12. The method according to claim 11, wherein, after determining the focus map and during imaging of the sample, an autofocusing control based on a triangulating autofocus method is used for maintaining the focus.

13. The method according to claim 1, wherein the microscope control arrangement is configured to allow for activating of different microscopic imaging modes, which are selectable independently from the activated predefined focusing setting.

14. A microscope control arrangement comprising one or more processors and adapted for controlling microscopic imaging of a microscope, wherein the microscope control arrangement is configured for receiving sample information concerning a sample to be imaged and for receiving a focusing request, wherein the sample information comprises a respective sample specification selected from a plurality of predefined sample specifications, wherein the plurality of predefined sample specifications comprises:

the sample being adherent to a sample carrier for carrying the sample;

the sample being detached from the sample carrier for carrying the sample;

the sample having a varying extension in a focal direction;

the sample being able to move; and/or the sample having a surface topology varying over time; and wherein the microscope control arrangement is further configured to activate, upon receipt of the focusing request and the sample information, a predefined focusing setting depending on the sample information received for controlling focusing of the microscope for microscopic imaging of the sample, wherein the activating the predefined focusing setting automatically initiates a focus strategy associated with the respective sample specification, wherein the initiating the focus strategy comprises:

when the respective sample specification specifies the sample as being adherent to a sample carrier for carrying the sample, using a triangulating autofocusing method for determining and/or maintaining a focus point, the focus point being used for sample imaging, when the respective sample specification specifies the sample as being detached from the sample carrier for carrying the sample or having a varying extension in a focal direction, defining a focus map of one or more focus points, or when the respective sample specification specifies the sample as being able to move, using an image based autofocusing method by evaluating a stack of images of the sample, each image being captured at a different focal position.

15. A microscope control arrangement comprising:
one or more memories for storing computer-executable instructions; and
one or more processors configured to execute the instructions so as to facilitate a method for controlling microscopic imaging of a microscope, the method comprising:
receiving sample information concerning a sample to be imaged and receiving a focusing request, wherein the sample information comprises a respective sample specification selected from a plurality of predefined sample specifications, wherein the plurality of predefined sample specifications comprises:
  the sample being adherent to a sample carrier for carrying the sample;
  the sample being detached from the sample carrier for carrying the sample;
  the sample having a varying extension in a focal direction;
  the sample being able to move; and/or
  the sample having a surface topology varying over time; and
activating, upon receipt of the focusing request and the sample information, a predefined focusing setting depending on the sample information received for controlling focusing of the microscope for microscopic imaging of the sample, wherein the activating the predefined focusing setting automatically initiates a focus strategy associated with the respective sample specification, wherein the initiating the focus strategy comprises:
  when the respective sample specification specifies the sample as being adherent to a sample carrier for carrying the sample, using a triangulating autofocusing method for determining and/or maintaining a focus point, the focus point being used for sample imaging,
  when the respective sample specification specifies the sample as being detached from the sample carrier for carrying the sample or having a varying extension in a focal direction, defining a focus map of one or more focus points, or
  when the respective sample specification specifies the sample as being able to move, using an image based autofocusing method by evaluating a stack of images of the sample, each image being captured at a different focal position.

16. The microscope control arrangement according to claim 14, wherein the microscope control arrangement comprises a graphical user interface including control widgets configured for receiving user inputs, the control widgets including at least one focus control widget for receiving the focus request by a user and at least one sample information widget for receiving the sample information by the user.

17. A microscope for microscopic imaging of a sample, the microscope comprising an autofocus control and a microscope control arrangement according to claim 14, the autofocus control being operatively coupled with the microscope control arrangement.

* * * * *